Fig. 3

3,443,610
SAWING APPARATUS
Erik Helmer Eriksson, Bjorna, and Olof Edvin Frisk and
Lars-Gunnar Högberg, Ornskoldsvik, Sweden, assignors
to Mo och Domsjo Aktiebolag, Ornskoldsvik, Sweden,
a limited company of Sweden
Filed July 5, 1966, Ser. No. 562,628
Claims priority, application Sweden, July 7, 1965,
8,998/65
Int. Cl. B27b 5/18
U.S. Cl. 143—57                                   21 Claims

ABSTRACT OF THE DISCLOSURE

An apparatus for sawing long objects, such as logs, of varying diameter into selected lengths is provided. The apparatus is composed of a rotatable support frame having a plurality of jaw-like gripping assemblies mounted on the frame. The jaw-like gripping assemblies face crosswise of the axis of rotation of the frame to receive and adjustably grip, according to size, opposite sides of an object positioned along the axis of rotation of the frame. Each of the jaws has means, such as a roller, which retains the object against radial displacement but permits the object to be moved axially during rotation of the frame at any rotational position. The rollers can be driven and thus provide the motive force for moving the object along the frame. A saw is fixed in relation to the frame in a position to cut off a selected length of the long objects retained on the frame upon rotation of the frame.

---

This invention relates to a sawing apparatus which is adapted for sawing long objects of varying diameter into selected lengths and more particularly it relates to a sawing apparatus having a rotatable frame and a plurality of adjustable gripping members for retaining a plurality of long objects of varying diameter, in a plurality of positions on the rotatable frame to successively saw the long objects into selected lengths.

The continuous operation of sawing of long objects which are conveyed lengthwise past a saw blade has in the past provided a substantial problem. Machines which were conventional to the art often suffered from comparatively low productivity since they normally required that the conveyor be started and stopped quite often. Moreover, usually a substantial spacing between one object to be sawed and the next had to be maintained. This spacing depended upon the conveyor's speed. Valuable time was lost in stopping and starting the conveyor and valuable conveyor space was lost due to the spacing which was normally required between the objects. Thus, apparatus which were conventional to the art often were relatively inefficient.

Sawing apparatus have also been provided by the prior art for sawing long objects in a manner that the sawing operation need not be interrupted. One such device is described in the U.S. Patent No. 2,123,580. However, this type of apparatus is not adapted for use with a longitudinal conveyor which delivers a long object at one end of the cutting apparatus.

The instant invention provides a sawing apparatus for cutting long objects of varying diameter into selected lengths on which a long object can be moved longitudinally to the saw. This can be done at the same time another object is being cut to a selected length. No interruption of the operation is needed during the forward movement of the long objects, and each long object is successively cut into selected lengths. The instant invention is particularly suited for use as a crosscut saw in the lumber and logging industries.

The instant sawing apparatus is designed for efficient operation and can be readily made portable. Thus, the expensive conveyor equipment which is generally required for transporting the long objects to the sawing apparatus from the stacks, rolls, and piles, in which they are stored, is greatly reduced. Moreover, in the lumber industry it has often been the case that the stationary sawing equipment has been situated a substantial distance from the logging site and thus valuable time is lost in transport. The apparatus which were known to the art were not portable, and during certain times of the year the transport of lumber from the storage areas to the apparatus can be quite expensive. The instant invention is adapted to be made portable and thereby eliminates many transport and storage problems.

The instant invention comprises an apparatus for sawing long objects of varying diameter into selected lengths comprising, in combination, a rotatable support frame for the long objects having a plurality of gripping assemblies mounted for rotation therewith, the gripping assemblies having at least one movable jaw shaped to receive and adjustably grip according to size, the opposite sides of an object positioned along the axis of rotation of the frame in a manner to retain the object against radial displacement but permit axial movement of the object along the frame; a sawing means fixed in relation to the frame in position to cut the objects held on the frame at one position along their circle over rotation; and means for moving the retained long object along the axis of the frame to an axial position for cutting off a selected length.

In a preferred embodiment of this invention, the apparatus also includes an adjustable stop member mounted on the frame at a fixed distance from the saw and adapted to stop the axial movement of the long object. Further, in a preferred embodiment of this invention, the means for moving the long object along the axial direction of the frame comprises a portion of the gripping assembly.

Long objects can be delivered to the sawing apparatus by conventional conveyors and the like, which deliver the long objects with their longitudinal axis parallel to the longitudinal axis of the apparatus in a position to be retained on the frame by the gripping assemblies.

The frame of the instant invention should comprise a rigid self-supporting unit which is adapted to be rotated. This can be made in the form of a drum or a drum-like unit having a plurality of axial beams and several cross supports or cross plates and thus be somewhat crate-like; it may also be made in box, shell, frame or compartmented construction, or in some combination of these. The frame can be constructed with a circular, triangular, square or any other cross section which permits the long objects to move longitudinally along it in a plurality of rows. The frame should be of a size such that it is adapted to be mounted on a bed provided with wheels for portable operation.

Axial rotation of the frame can be accomplished by the provision of suitable bearings, transmission and drive assemblies, such as gear drives, booster gears and electric motors. The drive assembly can also be powered by an internal combustion engine, a hydraulic engine or a compressed air motor. These as well as supports for the frame can be fixed to a wheeled bed disposed directly beneath the frame.

The frame is preferably supported on the bed in a cantilever fashion and will have one end adapted to receive long objects and the other adapted to deliver them. The frame can have a generally central support and an end support on the delivery side of the frame. The receiving end of the frame will comprise the free standing portion of the cantilever. This is preferred since often objects of great length will be sawn. These objects will extend beyond the end of the frame and will be retained on the frame for several rotations thereof. Thus, if there were an end support on the frame at the receiving end, the objects would be unable to pass by it. However, if this sawing apparatus is intended to be used to saw objects of a length shorter than the length between the saw blade and the end of the frame, an end support can be provided at the receiving end.

The bed can be made of several sections of different heights or can be completely flat. It can, if desired, be provided with a turntable and be adapted to be drawn by a tractor. Tracks or runners and the like can be used in place of the wheels or the bed can be made stationary and have no wheels or the like.

The bed can be provided with a carriage which is adapted to receive and cradle long objects. This carriage will be adapted to receive objects from a conveyor and position them for pick-up by the gripper assemblies on the frame. The bed can also be provided with delivery bars or arms which are adapted to displace the sawed sections from the gripper assemblies and guide them onto a conveyor.

A sawing means comprising a saw blade and an electric motor or the like can be mounted on thre bed. The sawing means, if desired, may be a milling blade, a chain saw, cutting tool or the like. The sawing means will preferably be mounted perpendicularly to the axis of rotation of the frame and be disposed near the center of the bed. The saw will be disposed such that as the frame rotates a long object retained thereon by the gripper assemblies will cross the saw and be cut into a selected length.

The gripping assembly of the instant invention will generally comprise at least one and preferably two jaws and will be adjustable to accommodate long objects of different diameters. A suitable jaw has a C- or L-shape and is adapted to grip long objects on opposite sides thereof. The gripping assemblies are preferably attached to the frame at the cross supports with one gripping surface or jaw thereof disposed on the frame at the support plate. The gripping assemblies however can be disposed on any portion of the frame of sufficient strength to support them and the long objects.

The other gripping portion or jaw will comprise the extending or hook-like portion of the C or L. Thus, the jaws will be adapted to grasp or grip a long object on opposite sides thereof. These gripping assemblies, in accordance with the instant invention, are adjustable. The adjustment can be carried out providing an extendable radial arm to which the jaw is attached. This radial arm will be movable generally radially inwardly toward the frame and radially outwardly away from it, thus, allowing the jaws to adjustably receive objects of different diameters and grip each tightly.

The adjustable gripping assemblies also can be in the form of an L-shaped or hook-shaped member which is connected at one end to the frame and is pivoted at this point. By pivotable movement of such a hook-shaped member, along an arc, a varying distance will be obtained between a hook-shaped end and the frame. Thus, this gripper or jaw will also provide adjustable gripping for objects of varying diameter, engaging them on opposite sides. Other types of grippers can also be used, however, the preferred embodiment utilizes radially extendable arms.

These arms can be extended by pneumatic means, gear drives and the like.

The gripping portion of the jaws can include a roller and preferably a roller having a shallow V-groove or somewhat concave portion. This configuration of the roller will ensure that a long object such as a log will remain firmly gripped at a predetermined position within the gripping assembly.

The rollers can be replaced by other types of grippers such as flat bearing surfaces, chain conveyors and the like. All that is required is that the grippers firmly retain the objects, but yet permit axial movement. The grippers will be disposed in rows along the frame on both sides of the saw blade, and in the preferred embodiment of this invention a plurality of gripper assemblies will engage and retain the long object along its length on the frame.

The gripping assembly on the receiving end will be disposed with the open jaw portions facing in the direction of rotation of the frame to pick up the long objects. Those on the delivery end will be oppositely disposed to deliver them.

The adjustable jaw configuration is chosen so that the gripping assemblies pick up the long objects in the L- or C-portion of the jaw from their cradled position on the bed. When a row of gripping assemblies on the receiving side of the frame does not have a long object within their grip they can be extended since they are adjustable to a fully open position such that they barely clear the bed. This can be accomplished by providing suitable sensing members which will automatically signal the adjusting mechanism to extend the gripping members when no long object is in position in a gripping assembly. When the gripping assemblies then in their circle of rotation pass by the carriage or cradle-like portion of the bed and when a long object is in position in the cradle, upon a signal from another sensing member, such as a micro-switch or the like, the gripping jaw can be caused to move radially inwardly toward the frame and thereby grip and retain a long object that it has picked up. As indicated above, the gripping assemblies on the delivery side of the frame will preferably be disposed with their jaws facing in a direction opposite to the direction of rotation of the frame. These gripping assemblies do not normally pick up the log from its cradled position and thus need not be faced in the same direction as the grippers on the receiving side of the saw blade. These grippers will preferably be adapted to deliver the long object from the sawing apparatus, and thus it is preferred that these grippers have their jaws extending in the opposite direction. Thus, by merely providing a delivery bar or arm which extends in the path of rotation of the long objects, as the object passes the bar, it can be lifted from the gripping members and delivered from the apparatus.

The means for moving the long object along the frame can be a pushing apparatus, gravity, rollers and the like. A gravity feed can be accomplished by merely inclining the frame at a relatively large angle. The weight of the long object will then move it axially on the frame on the rollers and the like of the gripping assemblies.

In the preferred embodiment of the instant invention, at least one gripping assembly in each row will be adapted to convey the long objects along the axis of the sewing apparatus. This can be accomplished by providing a driven gripping roller. The drive assembly can be any of the drive assembles well known to those skilled in the art such as an electric motor, mechanical gear transmission and the like and a preferred drive means for moving the object along the frame will be more particularly described hereinafter.

The gripping assembly may also be so designed that a gripping roller performs an oscillating motion instead of a rolling motion, and may move in a circular path.

Suitable mechanisms will be provided to start and stop the forward feed drive and these also will be more particularly described hereinafter.

It is possible to select the length to be sawed from the object by control of the axial feed. Since the starting position and the rate of axial movement of the long object are known, it is possible to merely calculate the time necessary to convey a selected length of the long object beyond the saw blade. The drive mechanism can then be stopped and a selected length will be cut from the long object.

In the preferred embodiment of the instant invention, however, stop members are provided to interrupt the longitudinal movement of the long object along the frame.

These stop members can be either fixed in a position relative to the saw blade or movable along the frame to provide a variable length for the cut sections of the long objects. A movable stop member is preferred in this invention. The stop member can also be constructed to automatically return to a minimum fixed position adjacent to the saw blade after a section of the long object has been severed and delivered from the gripping members. This is extremely useful when the length to be cut may vary with each long object or with small groups of objects. This embodiment of the stop member will be more particularly described below.

In operation, a long object such as a log will be disposed on a conveyor adjacent to the carriage or cradle on the bed. As the frame rotates, a sensing member will indicate that a particular row of gripping assemblies on the receiving side of the frame is empty. A log will then be deposited onto the carriage between the frame and the bed from the conveyor. As rotation of the frame continues the open gripping assemblies will receive a signal or pulse which indicates that a new log is in position to be received. The gripping assemblies then close upon and retain the log that is picked up and gripped on both sides by the grippers. It is retained thereby in a peripheral position on the frame. The log will then be conveyed along the frame by an axial feeding means which, as indicated above, can be incorporated into the gripping assembly. The log will be conveyed a selected distance along the frame until further movement is prevented either by a stop member or by stopping the drive mechanism. As the frame rotates, this log will be brought into contact with the saw blade and the end portion thereof severed. This severed portion will be held by a gripping assembly on the delivery side of the saw blade. As rotation continues further, the log will be lifted from this gripping assembly by a delivery bar and transported to a conveyor.

When the remaining portion of the log is free of the saw blade, it will be moved along the frame again until a selected length beyond the saw blade is reached. This operation is carried out cyclically for each row of gripping assemblies. A particular preferred embodiment of the sawing apparatus will be described in connection with the drawings in which:

Figure 1:
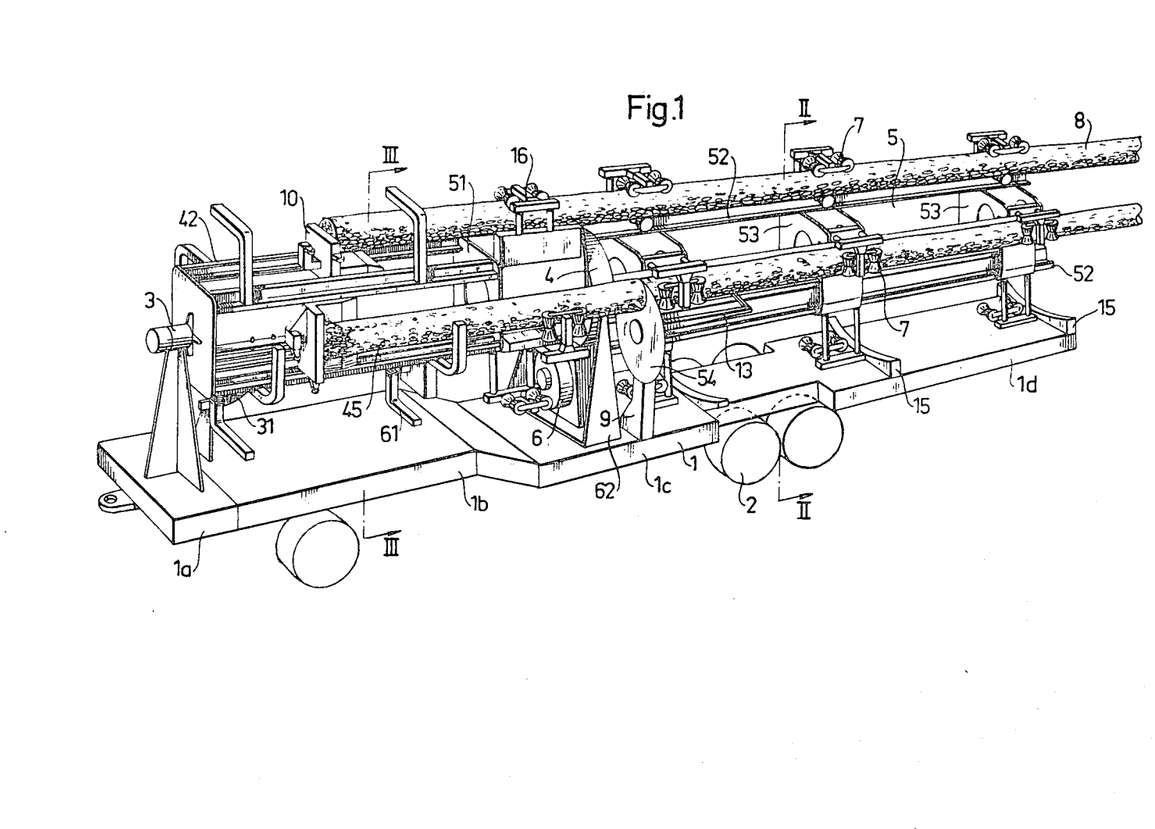
FIGURE 1 is a view in perspective of the portable sawing apparatus of the instant invention.

In the embodiment of FIGURE 1, a frame 5 is shown rotatably mounted to a frame bed 1 having a plurality of wheels 2.

The frame comprises generally two sections. One section, the receiving end, comprises a plurality of girders 52, supported by a plurality of support plates 53, disposed perpendicularly to the girders. This section of the frame is supported in a cantilever manner and is mounted at one end to a posterior step bearing 4 for rotation. The second section, the delivery end, is made of girders 42 which are supported by support plates 51. This portion of the frame is fixed relative to the cantilever portion for rotation therewith. It is supported at its end by an anterior step bearing 3 and a pedestal which rests against the bed 1. The bed is generally flat and is composed of four sections 1a, 1b, 1c and 1d. Sections 1a and 1b are raised slightly relative to sections 1c and 1d. A saw blade 54 is fixed perpendicularly to the longitudinal axis of the frame and in proximity thereto adjacent to the posterior step bearing 4. The saw blade 54 is rotatably mounted on a column 9 and is driven by an electric motor. This column is also rotatable to permit different angles of cutting and to prevent the saw blade from extending beyond the bed 1 during transport. A pedestal base 62 of the posterior step bearing 4 is disposed adjacent to this column 9. This pedestal base supports the posterior bearing 4 and also serves as a gear housing for the transmission and drive assembly 6. This drive assembly includes an electric motor which provides suitable rotational force for the frame. A plurality of transverse girders 15 are provided across the bed at the receiving end. These transverse girders 15 comprise the cradle or carriage 14 from which a long object or log 8 is picked up. These girders are so disposed that the gripping and feed assembly 7 can freely pass between them.

The gripping and feed assemblies 7 are fixed to the support plates 53 on the receiving end of the apparatus. These are all identical units for easy replacement, and are aligned in rows to axially feed the long objects 8 and retain them in position during rotation of the frame. The gripping and feed assemblies on the receiving end of the apparatus are somewhat L- or C-shaped. This can best be seen by reference to FIGURE 2. The open jaw or hook-like portion of the gripping assembly on the receiving end of the apparatus is disposed facing in the direction of rotation of the drum. The gripping and feed assemblies on the delivery end are oppositely disposed. The delivery side of the frame is also fitted with a plurality of L-shaped hooks 61. These L-shaped hooks are disposed with the open hook facing in the same direction as the gripping and feed assemblies, i.e., opposite to the direction of rotation of the frame. These hooks 61 assist in the removal of the sawed section 45 of the long object from the assembly. Removal of the sawed sections 45 is accomplished by fixed delivery bars 30 which extend into the circle of rotation of the sawed sections 45.

Stop members 10 are also provided on the delivery end of the apparatus and the distance along the frame between the saw blade 54 and the stop members 10 will determine the length of section 45 to be sawed from the long object 8. These stop members will be more particularly described below in connection with FIGURES 7, 8 and 10.

Figure 6:
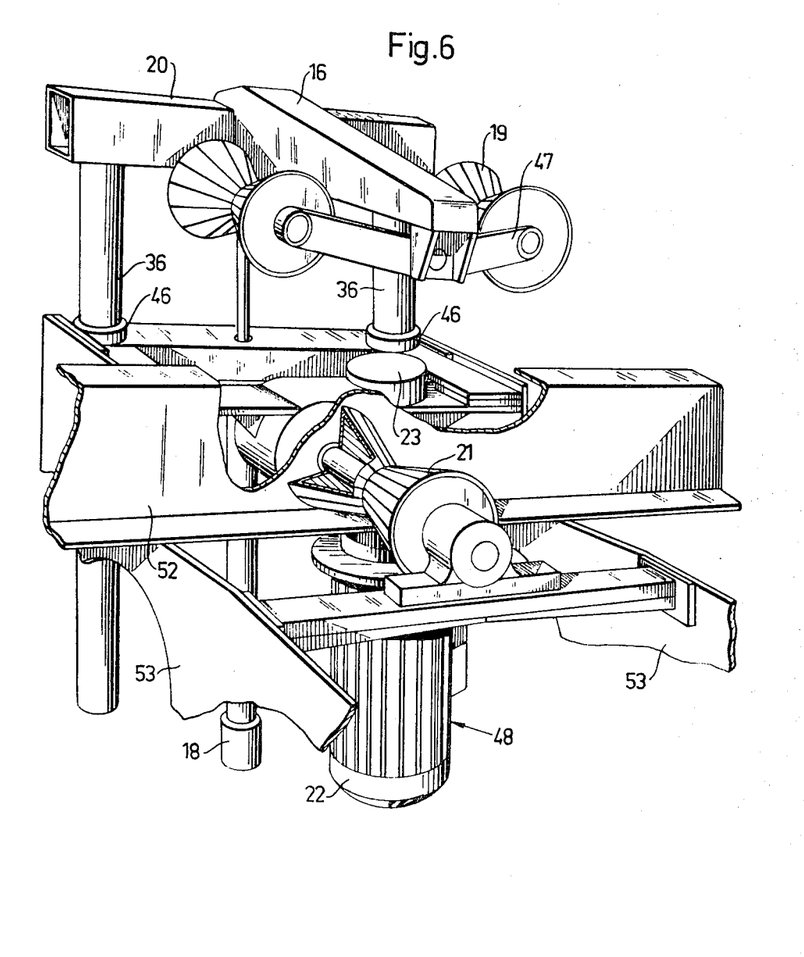
FIGURE 6 is an enlarged view, partially broken away, of a gripping and forward drive assembly.

The gripping and feed assemblies 7 can best be seen by reference to FIGURE 6. This assembly is adapted to pick up, grip the object on opposite sides, and axially feed the long object 8 along the frame. The device as shown in FIGURE 6 comprises a gripping jaw 16 which is supported by a yoke 20 which is fixed to two guide shafts 36 which extend from the yoke to the frame 52 and the cross support 53. These shafts are enclosed by guide tubes 46 and form radial extensions of the frame. This can best be seen by reference to FIGURES 2 and 3. A hydraulic cylinder 18 is attached to the yoke 20 for moving the jaw radially to provide the adjustment of the gripping assembly. A pendulum bogie 47 is carried at the end of the gripper jaw 16. This bogie has two rollers 19 which have a somewhat shallow V-grooved central portion. This construction ensures that the logs or long objects will be securely held by the rollers. A similarly shaped shallow V-groove roller 21 is fixed directly beneath the concave rollers 19. This second roller also comprises a jaw of the gripping assembly. These rollers 19 and 21 are fluted to provide extra traction against the long object 8. Roller 21 is driven by an electric motor 22 and a transmission 23. The driven rotation of this roller provides the axial drive for the long object 8. The number of these gripping and feed assemblies on the frame is selected with regard to the weight of the long object and the speed at which they are to be axially fed forward. It is to be noted that all of the gripping and feeding assemblies 7 need not be provided with drive means, such as the motor 22 and the transmission 23. Those without drive mechanisms would merely act as gripping members and guide members, but would not drive a long object forward toward the saw blade 54.

It should also be noted that the driven roller could be the rollers 19 as well as, or in the place of the rollers 21.

Figure 7:
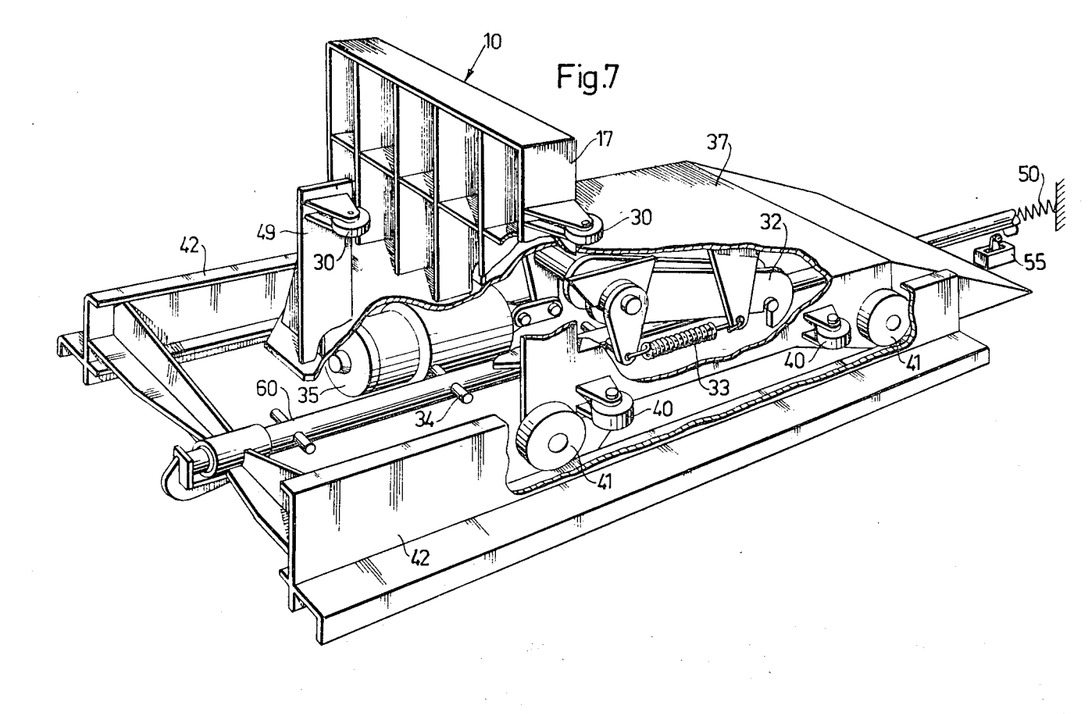
FIGURE 7 is an enlarged view, partially broken away of a stop member.
Figures 8, 9:
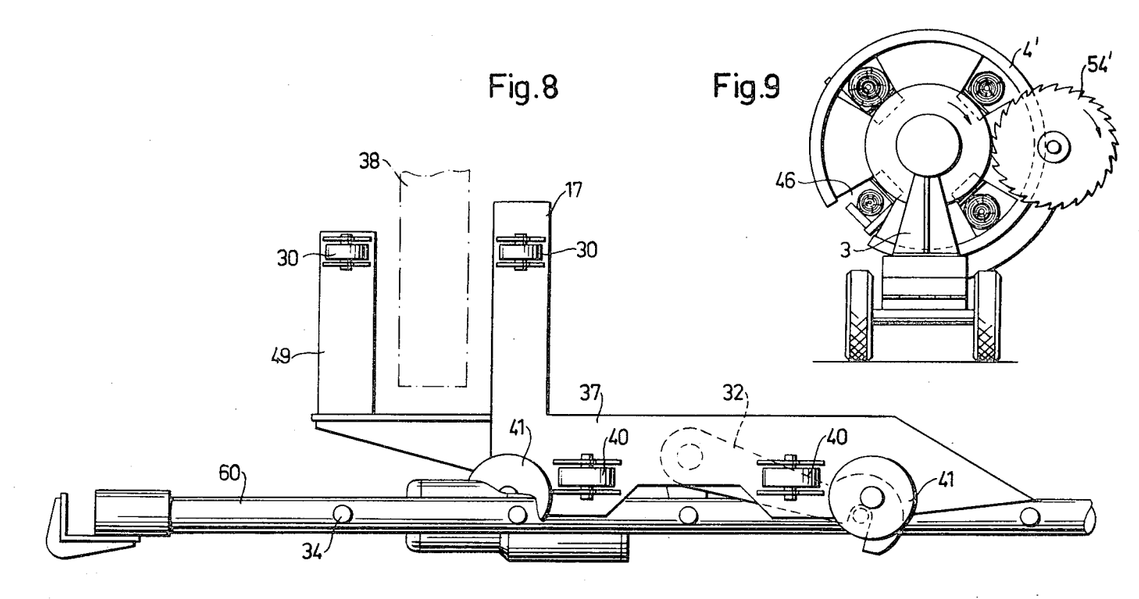
FIGURE 8 is a side view of a portion of the apparatus shown in FIGURE 7.
FIGURE 9 is a schematic view of another embodiment of the invention.

The movable stop carriage 10 is disposed in each row at the delivery end of the frame for controlling the length of sawed portions 45. The stop carriage 10 is shown in FIGURES 7 and 8 and comprises a frame 37, carried and controlled by wheels 40 and 41 which run in girder 42. Attached to the frame 37 is an angularly disposed stop bolt 17 which faces the saw blade 54.

Two roller wheels 30 are mounted on frame 37 and stop bolt 17. As the frame rotates, the rollers bear on a threaded girder 31 (FIGURE 1), and return the stop carriage 10 to its position next to saw blade 54. This can be assisted by an electric motor (not shown).

Catch 32 is adjustably mounted on frame 37. When catch 32 is normally held in a raised position by a spring 33, it is free to run along shaft 60 and is not stopped by the length-governing stops 34 which are disposed in pairs along shaft 60. Catch 32 will bear downwardly against rod 60 and be retained by stops 34 when action of the traction motor 35 forces it downward. Actuation of the motor 35 can be accomplished by an impulse which is supplied either automatically by circuit breakers, e.g., micro breakers, or manually, by an operator. Catch 32 is designed such that in its depressed position it automatically stops carriage 10 at the next stop 34, and at the same time prevents stop carriage 10 from recoiling from the desired stop position.

Shaft 60 is axially suspended at the end of the frame facing sawing blade 54. It is held by a spring 50, to damp the impact occurring at the stop.

The stop bolt 17 and self-supporting bracket 49 are shaped and positioned such that the fixed delivery arms 38 can freely pass in front of or behind stop bolt 17 or bracket 49 when the stop member 10 is at a stopped position near delivery arms 38 (FIGURE 8).

Figure 10:
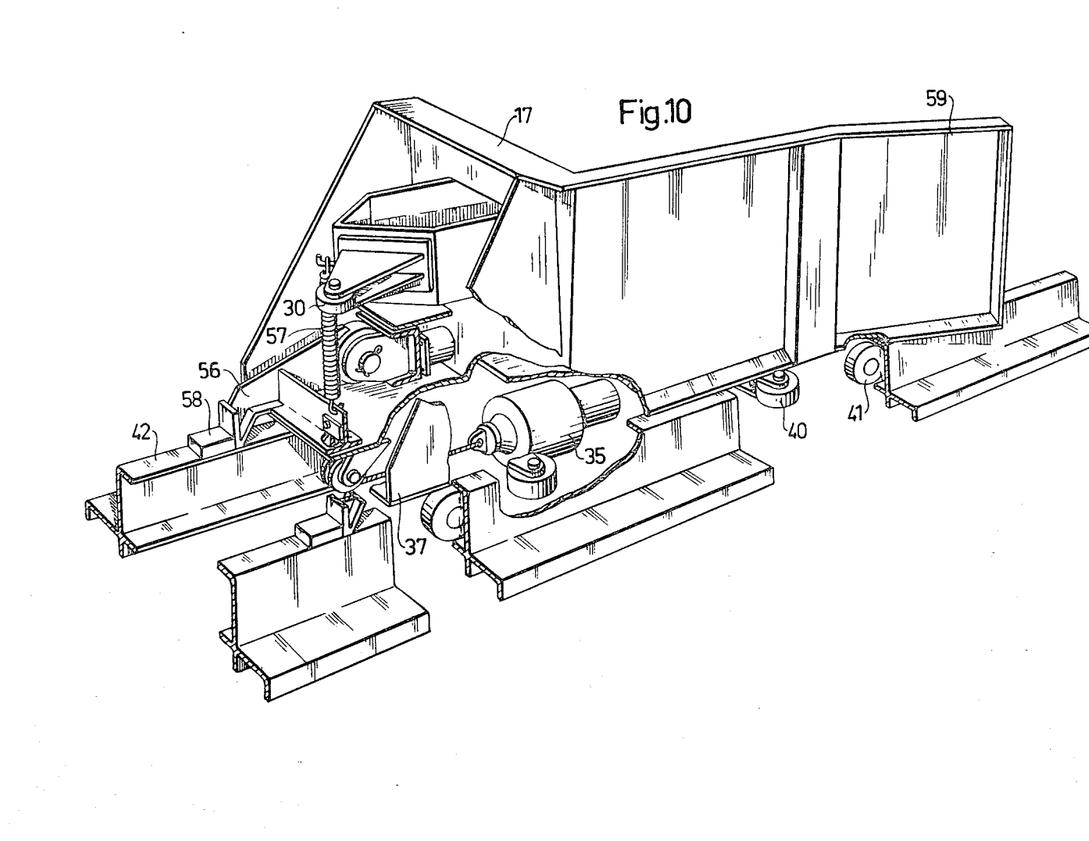
FIGURE 10 is a view, in perspective, and partially broken away of another stop member of the instant invention.

Another embodiment of the stop member is shown in FIGURE 10. This stop member includes a radially extended support 59 which permits the elimination of the hooks 61 mentioned above. This embodiment includes movably attached catches 56 which are normally held in a raised position by a spring 57. These catches are raised above the cleats 58 which are disposed in pairs along the girders 42. These cleats correspond to the stops 34 in the embodiment previously described and determine the stopped positions of the stop members.

As in the embodiment discussed above, the catches 56 are displaced downwardly and cause to engage the cleats 58 by action of a traction motor 35. The operation of the stop members as well as the operation of the entire apparatus will be more particularly described below.

Figure 2:
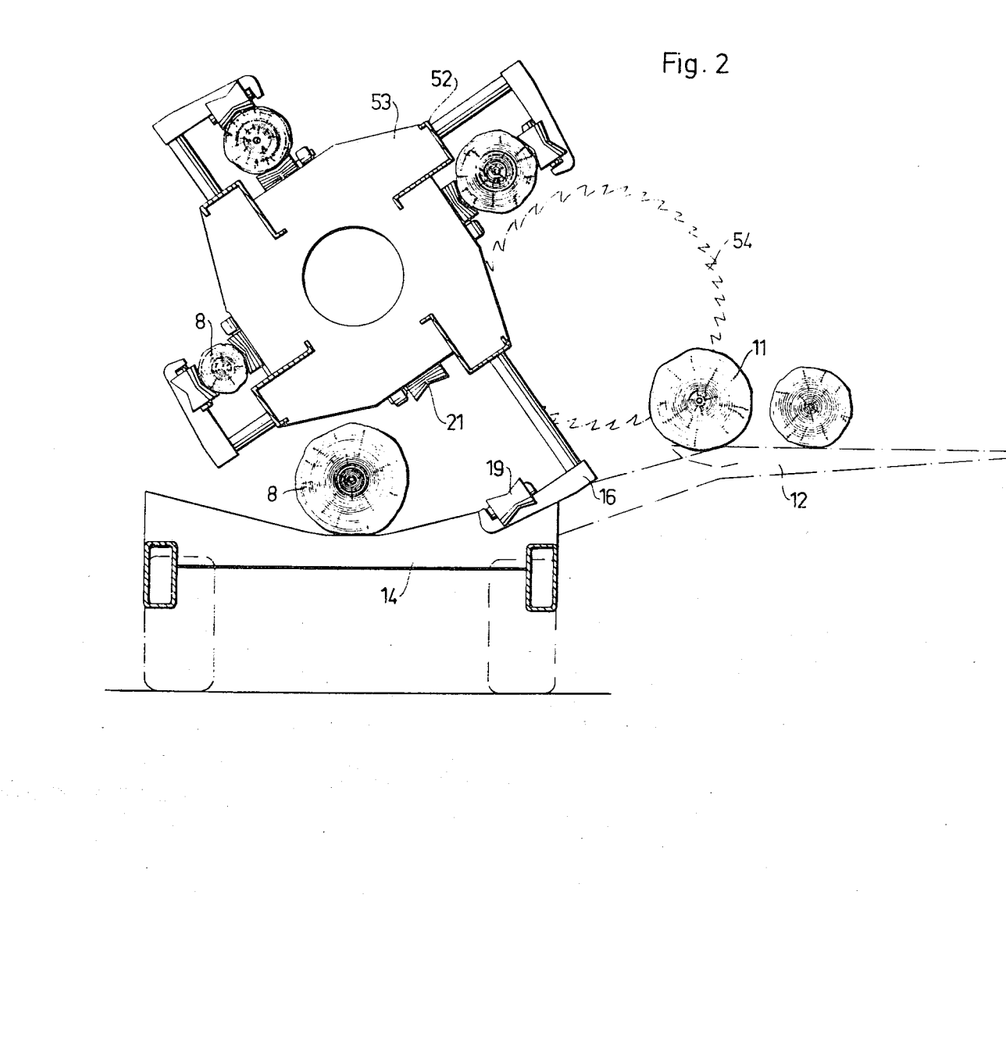
FIGURE 2 is a view in section of the apparatus shown in FIGURE 1, taken along the line II—II of FIGURE 1.
Figure 3:
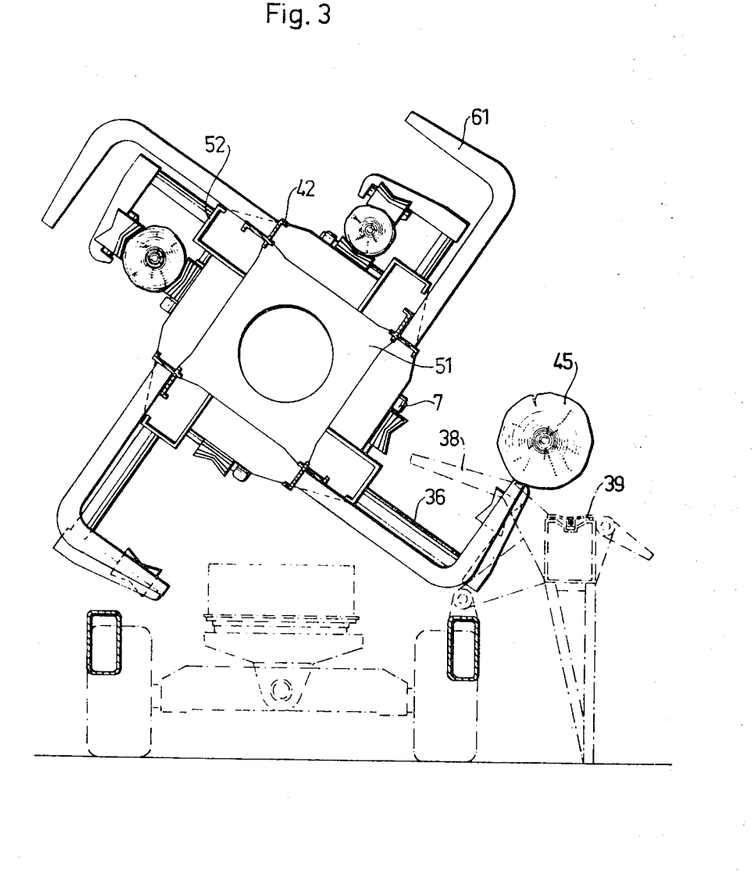
FIGURE 3 is a view in section of the apparatus shown in FIGURE 1, taken along the line III—III of FIGURE 1.

In operation, one or more long objects 11, shown in FIGURE 2, are disposed on a conveyor table, or other delivery apparatus and the like, in proximity to the cradle or carriage 14 for delivery thereto. A sensing or pulsing member 13, shown in FIGURE 1, will signal that a row of gripping members is empty on the receiving end of apparatus for a certain distance adjacent to the saw blade 54. This signal will result in a long object being delivered to the cradle member 14. It is to be noted that delivery of the long objects to the cradle 14 can be initiated by visual inspection and manual initiation of the delivery apparatus by an operator.

Figure 4:
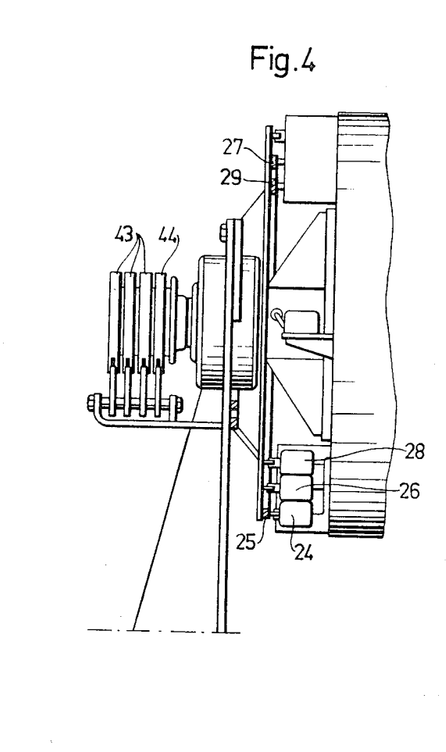
FIGURE 4 is a side view in greater detail of one end of the apparatus shown in FIGURE 1.
Figure 5:
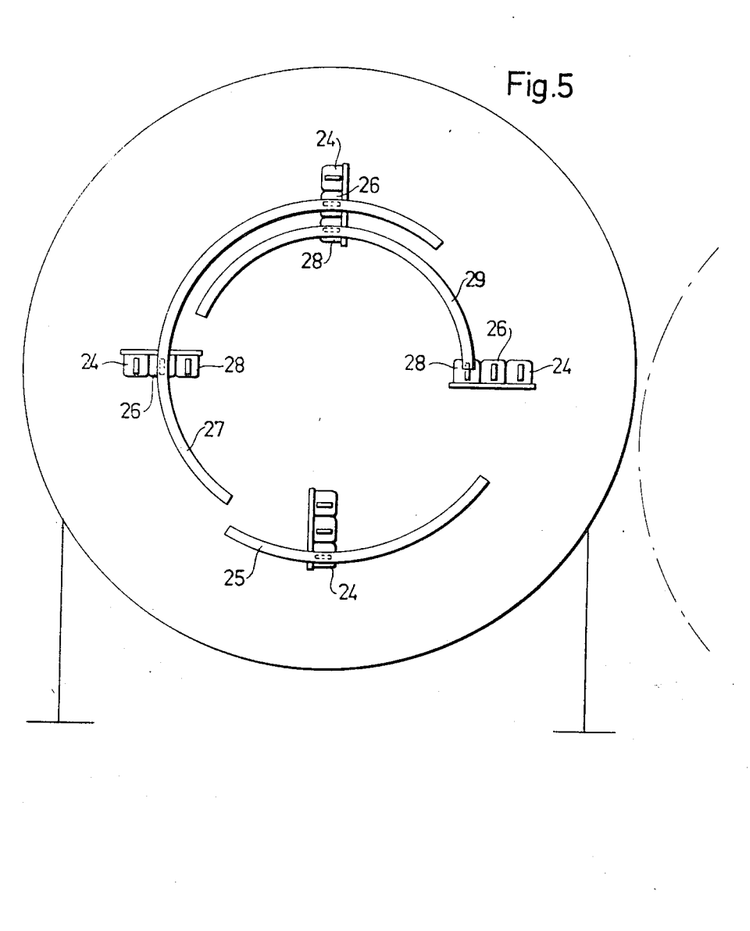
FIGURE 5 is a schematic view of a means for controlling the gripping and forward drive assemblies.

As rotation of the frame continues, the gripping assemblies, the jaws of which are in a fully open position (FIGURE 2) pass between the transverse girders 15 of the cradle 14 to receive the new long object which is now denoted as 8. When the empty row of gripping assemblies pass a particular rotational position, they will receive a signal from a sensing member, and the jaws 16 of the gripping assemblies will shut to engage and retain the long object 8. A typical pulse member 24 is shown in FIGURE 4 at the delivery end of the frame. Such pulsing members are well known to those skilled in the art and can comprise, for example, a microswitch circuit breaker mounted on the end of the frame. This switch corresponds to a particular row. It can be actuated by movement along a stud curve 25 attached on the bearing 3. This can best be seen by reference to FIGURE 5. The closing of the jaws is also actuated by a pulsing member and is accomplished by the actuation of a hydraulic valve causing the hydraulic cylinder 18 to close. The jaws of the gripping and feed assemblies thereby lift and carry the long object from the carriage 14 and hold it tightly on opposite sides. One jaw of each assembly includes the driven roller 21.

At a selected circumferential distance from the "pick-up point," the gripping assemblies which have just engaged the object 8 will receive a signal from a pulsing member 26 operating against cam curve 27 to actuate motor 22. This motor 22 causes the feed rollers 21 to turn and thereby axially feed the objects 8 toward the stop members 10 on the delivery side of the saw blade 54. This stop member will have returned to its position adjacent to the saw blade 54 by action of the rollers 30 and the threaded girder 31.

When the object 8 contacts the stop member 10, the drive motors 22 will receive a pulse from a microswitch pulsing member 55 disposed at one end of the rod 60, which stops their operation. The gripping assemblies 7 on the delivery side of the saw blade 54 and in proximity to the stop members 10 will then receive a signal from a pulse member 28 which operates against a cam curve 29 to cause engagement of the jaws and the long object 8, such that the long object is gripped at opposite sides thereof. The object is now gripped by the gripping assemblies on both the receiving and delivery ends of the frame.

If the long object 8 is to be sawed in this position, the traction motor 35 will then be actuated by the operator to actuate the catch 32. If the long object 8 is to be sawed at a greater length, the traction motor will receive a signal from the pulse member 26 acting against a cam curve 27, to release catch 32 from stop 34. Subsequent to this signal, the drive motor 22 will receive a starting signal from pulse member 26 acting against cam curve 27 and the long object will then be axially further conveyed along the frame. It is to be noted that the signal which actuates the motor 22 will be subsequent to the signal which releases the catch 32 from the stop 34.

The axial feed of the long object 8 can be stopped in any desired position by a signal provided to the traction motor 35 by an operator, thus causing engagement of the catch 32 and the next following stop 34. Upon this engagement, the circuit breaker 55 will provide a signal which stops the drive motors 22. The object 8 will then be in the desired sawing position and will be held in this position as rotation of the frame continues. Naturally, the speed of rotation of the frame will be adjusted to permit the stop to reach the desired position.

As the rotation of the frame causes the long object to pass through the saw blade, it will be cut into two sections. As the long object is cut the gripping assemblies which retain the long object on the delivery side of the saw blade 54 will receive a signal from pulse member 28 acting against cam curve 29 and open. The sawed portion 45 will then come into contact with guide shafts 36 and hooks 61. As the frame continues to rotate, the sawed portion 45 will be lifted from the guide shafts 36 and the hooks 61 by the fixed delivery arms 38. It will then roll onto a conveyor 39 or the like which carries the sawed portion 45 from the apparatus. This can best be seen by reference to FIGURE 3.

The operating cycle is the same for each row of gripping assemblies on the frame, although each row will have its own set of pulsing members 24, 26 and 28. The cam curves are used commonly by all rows. Thus, each row can function each in its own cycle simultaneously with and independently of the other. It is possible, as indicated above, by the instant apparatus to cut each log to a different selected length.

The electric power is supplied to the electric components mounted on the frame by means of slip ring motors 43. Auxiliary current for manual stopping of the stop members can be supplies by means of a slip ring motor 44.

In FIGURE 9 a modified version of the instant invention is shown. In this embodiment, an inward feed through rail caps 46 is shown. This construction utilizes a modified form of step bearing 41 and permits greater latitude in the placement of this bearing.

The instant invention is particularly adapted for use in sawing logs and has been used to accommodate logs up to a diameter of 70 cm. This devise has accomplished the sawing of such logs into sections of varying length between 3 m. and 6 m. and can theoretically saw 720 such sections per hour at a frame rotation speed of 3 r.p.m. The number of sections cut will be independent of their average length. This number of sections is approximately twice the capability of the sawing apparatus known to the art.

Having regard to the foregoing disclosure, the following is claimed as the inventive and patentable features thereof:

1. An apparatus for sawing long objects of varying diameter into selected lengths comprising, in combination an object support frame rotatable about a longitudinal axis and having a plurality of gripping assemblies mounted for rotation therewith, the gripping assemblies having at least one movable jaw crosswise of the axis of rotation of the frame and shaped to receive and adjustably grip according to size opposite sides of an object positioned along the axis of rotation of the frame and having means associated with the jaw for retaining the object against radial displacement but permitting axial movement of the object along the frame; a sawing means fixed in relation to the frame in a position to cut objects held on the frame at a position along their circle of rotation; and means for moving the object while retained in the jaws along the axis of the frame to a selected axial position for cutting off a selected length.

2. An apparatus for sawing long objects of varying diameter into selected lengths in accordance with claim 1, in which the gripping assemblies are adapted to pick up and grip the long object from a position in proximity to the frame during rotation of the frame.

3. An apparatus for sawing long objects of varying diameter into selected lengths in accordance with claim 1, in which the means for moving the long object along the axis of the frame is a driven feed roller.

4. An apparatus for sawing long objects of varying diameter into selected lengths in accordance with claim 3, in which the feed roller comprises the means associated with the jaw on the gripping assemblies for retaining the object.

5. An apparatus for sawing long objects of varying diameter into selected lengths in accordance with claim 1, in which the gripping assemblies include a radially extendible L-shaped arm having at least one roller on the end of the arm.

6. An apparatus for sawing long objects of varying diameter into selected lengths in accordance with claim 1, in which the gripping assemblies have two jaws which include at least two rollers which are adapted to grip the object at opposite sides, one of said rollers being driven to cause axial movement of the long object.

7. An apparatus for sawing long objects of varying diameter into selected lengths in accordance with claim 1, in which the frame has a receiving end and a delivery end and in which the jaws of the gripping assemblies on the receiving end of the frame face in the direction of rotation of the frame and the jaws of the gripping assemblies on the delivery end face in opposite direction.

8. An apparatus for sawing long objects of varying diameter into selected lengths in accordance with claim 1 including means for removing the long object from the frame.

9. An apparatus for sawing long objects of varying diameter into selected lengths in accordance with claim 1, in which the action of the gripping assemblies and the action of the means for moving the long objects along the axis of the frame are initiated by pulses created by the interaction of cam curves and switches.

10. An apparatus for sawing long objects of varying diameter into selected lengths in accordance with claim 1 including a cradle from which the long objects are picked up, gripped and retained.

11. An apparatus for sawing long objects of varying diameter into selected lengths in accordance with claim 1 including a stop member which is adapted to stop the axial movement of the long object along the frame and thereby determine the length of the portion to be sawed.

12. An apparatus for sawing long objects of varying diameter into selected lengths in accordance with claim 11, in which the stop member automatically returns to a fixed position adjacent to the sawing means subsequent to discharge of the sawed portion.

13. An apparatus for sawing long objects of varying diameter into selected lengths in accordance with claim 12, in which the stop means returns to its position adjacent to the sawing means by means comprising rollers and a threaded girder.

14. An apparatus for sawing long objects of varying diameter into selected lengths in accordance with claim 11, in which the frame includes cleats for retaining the stop member at a desired position.

15. An apparatus for sawing long objects of varying diameter into selected lengths in accordance with claim 1, in which the gripping assemblies are identical to each other and interchangeable with each other.

16. An apparatus for sawing long objects of varying diameter into selected lengths in accordance with claim 1, in which the receiving end of the frame is supported in a cantilever manner to allow the sawing of objects longer than the frame.

17. An apparatus for sawing long objects of varying diameter into selected lengths in accordance with claim 1, in which the apparatus is mounted on a wheeled bed and is portable.

18. An apparatus for sawing logs of varying diameter into selected lengths comprising, in combination, a rotatable drum-like support frame for the logs, having a delivery end and a receiving end, and having a plurality of radially extendible jaw-like gripping assemblies arranged axially in rows along the frame and mounted peripherally for rotation therewith, the gripping assemblies having at least two roller jaws shaped to receive and ajustably grip according to size opposite sides of a log positioned along the axis of rotation of the frame to be sawed, one of said roller jaws being driven and thereby adapted to move the log along the axis of the frame; the jaws on receiving end of the frame being disposed to face in the direction of rotation of the frame, and the jaws on the delivery end being disposed to face in the direction opposite to the direction of rotation of the frame; a sawing means fixed at an angle to the axis of rotation of the frame and disposed in proximity thereto to cut objects held on the frame at a point at which the sawing means and the circle of rotation of the logs intersect; stop means for interrupting the movement of the log along the frame, said stop means being disposed on the delivery end of the frame to thereby determine the length of the portion of the log to be cut off, and means for removing and delivering the sawed portion of the log from the frame.

19. An apparatus for sawing logs of varying diameter into selected lengths in accordance with claim 18 in which the stop means are adjustable and adapted to return to a minimum fixed position adjacent to the sawing means.

20. An apparatus for sawing logs of varying diameter into selected lengths in accordance with claim 18, in which one portion of the jaw-like gripper assemblies is L-shaped.

21. An apparatus for sawing long objects of varying diameter into selected lengths in accordance with claim 1, in which the gripping assemblies permit axial movement of the long object along the frame during rotation of the frame at any rotational position, while the long objects are retained against radial displacement.

References Cited

UNITED STATES PATENTS

| | | | |
|---|---|---|---|
| 88,943 | 4/1869 | Chase et al. | 143—57 X |
| 237,161 | 2/1881 | Brown | 143—57 |
| 1,450,657 | 4/1923 | Walker. | |
| 2,123,580 | 7/1938 | Wheless | 143—57 |
| 1,771,295 | 7/1930 | Hafleigh | 143—57 |

DONALD R. SCHRAN, *Primary Examiner.*

U.S. Cl. X.R.

83—411

UNITED STATES PATENT OFFICE
CERTIFICATE OF CORRECTION

Patent No. 3,443,610                                May 13, 1969

Erik Helmer Eriksson et al.

It is hereby certified that error appears in the above numbered patent requiring correction and that the said Letters Patent should read as corrected below.

Column 3, line 24, "thre" should read -- the --.
Column 3, line 66, "portion" should read -- portions --.
Column 4, line 54, "assembles" should read -- assemblies --. Column 6, line 22, "crade" should read -- cradle --. Column 7, line 12, after the words "or in" delete the word "the". Column 9, line 14, "supplies" should read -- supplied --; line 37, (Claim 1), after the word "jaw" insert the word -- facing --.

Signed and sealed this 4th day of November 1969.

(SEAL)
Attest:

EDWARD M. FLETCHER, JR.                     WILLIAM E. SCHUYLER, JR.
Attesting Officer                                Commissioner of Patents